United States Patent
Singh et al.

(10) Patent No.: US 10,904,828 B2
(45) Date of Patent: Jan. 26, 2021

(54) ALIGNING GNSS LOCATION DETERMINATION WITH WIRELESS WIDE AREA NETWORK PAGING SLOTS

(71) Applicant: QUALCOMM Incorporated, San Diego, CA (US)

(72) Inventors: Gurdarshan Singh, Pleasanton, CA (US); Duong Hoang, San Diego, CA (US)

(73) Assignee: Position Location and Repeaters PRB, San Diego, CA (US)

( * ) Notice: Subject to any disclaimer, the term of this patent is extended or adjusted under 35 U.S.C. 154(b) by 0 days.

(21) Appl. No.: 15/975,150

(22) Filed: May 9, 2018

(65) Prior Publication Data
US 2019/0349853 A1  Nov. 14, 2019

(51) Int. Cl.
H04W 24/00 (2009.01)
H04W 52/02 (2009.01)
G01S 19/25 (2010.01)

(52) U.S. Cl.
CPC ....... H04W 52/0216 (2013.01); G01S 19/258 (2013.01)

(58) Field of Classification Search
CPC ......... H04W 4/02; H04W 4/14; H04W 48/04; H04W 48/16; H04W 52/02; H04W 64/00; H04W 68/00
USPC .. 455/434, 456.1–456.6, 457, 458, 466, 574
See application file for complete search history.

(56) References Cited

U.S. PATENT DOCUMENTS

| | | | |
|---|---|---|---|
| 6,429,811 B1 * | 8/2002 | Zhao | G01S 19/27 342/357.66 |
| 6,473,030 B1 * | 10/2002 | McBurney | G01C 21/206 342/357.43 |
| 6,611,688 B1 * | 8/2003 | Raith | H04W 4/02 340/992 |
| 8,554,212 B1 * | 10/2013 | Rai | H04W 36/0061 455/161.1 |
| 9,131,462 B1 * | 9/2015 | Verghese | H04W 4/029 |
| 9,848,380 B1 * | 12/2017 | Ekambaram | H04W 52/0209 |
| 2005/0020309 A1 * | 1/2005 | Moeglein | G01S 5/0236 455/561 |
| 2009/0054075 A1 * | 2/2009 | Boejer | G01S 19/09 455/456.1 |
| 2009/0278738 A1 | 11/2009 | Gopinath | |
| 2010/0325194 A1 | 12/2010 | Williamson et al. | |

(Continued)

FOREIGN PATENT DOCUMENTS

| | | |
|---|---|---|
| EP | 2105756 A1 | 9/2009 |
| EP | 3301484 A1 | 4/2018 |

OTHER PUBLICATIONS

International Search Report and Written Opinion—PCT/US2019/021756—ISA/EPO—dated Jun. 17, 2019.

*Primary Examiner* — Matthew W Genack (57) ABSTRACT

Techniques are provided which may be implemented using various methods and/or apparatuses in a mobile device to determine its location. Techniques are provided which may be implemented using various methods and/or apparatuses on a mobile device to enable location determination during paging slots, wherein location is determined after both a location determination interval and the succeeding paging slot interval are complete. Determined location is stored and may be provided in response to requests from applications, application servers, location servers and for other purposes or entities.

26 Claims, 4 Drawing Sheets

(56) References Cited

U.S. PATENT DOCUMENTS

| | | | |
|---|---|---|---|
| 2013/0225145 A1* | 8/2013 | Cherian | H04W 52/0264 |
| | | | 455/418 |
| 2013/0337832 A1* | 12/2013 | Park | H04W 60/04 |
| | | | 455/456.1 |
| 2014/0274111 A1* | 9/2014 | Edge | H04W 4/023 |
| | | | 455/456.1 |
| 2015/0173122 A1* | 6/2015 | Schliwa-Bertling | |
| | | | H04W 76/048 |
| | | | 370/311 |
| 2016/0300067 A1* | 10/2016 | Meredith | G06F 16/2465 |
| 2016/0370472 A1* | 12/2016 | Nemer | B60L 53/60 |

* cited by examiner

ALIGNING GNSS LOCATION DETERMINATION WITH WIRELESS WIDE AREA NETWORK PAGING SLOTS

BACKGROUND

1. Field

The subject matter disclosed herein relates to electronic devices, and more particularly to methods and apparatuses for use in or with a mobile device to reduce power consumption associated with location determination.

2. Information

Mobile devices are utilized to provide location related information to applications, such as location-sensitive information requests, lost phone locator, mapping and location determination and navigation services. Location accuracy and time to fix affect the usability and attractiveness of these and other location enabled services. However, determining location in the absence of pre-existing location information may be a slow, power-consuming process and impacts location accuracy. Periodic location determination enables immediate availability of prior location information, particularly for applications not requiring pinpoint accuracy and also provides a seed position for a new location determination attempt, thereby improving the speed and accuracy of a location determination process. However, periodic location determination, even in the absence of immediate requests for location information, multiplies the power usage associated with position determination. Scheduling location determination processing to opportunistically coincide with the operation of other system processes that would otherwise need to be started during location determination on the mobile device would enable greater periodic location power efficiency.

SUMMARY

Some example techniques are presented herein which may be implemented in various method and apparatuses in a mobile device to determine location during and/or subsequent to paging slots. In various embodiments, mobile devices may be used to determine location periodically, during or after a subsequent paging slot.

In accordance with an example implementation, a method may be provided which comprises, transitioning a wide area network (WAN) wireless modem, on the mobile device, to a low power state; in response to expiration of a first timer and expiration of a second timer, transitioning the WAN wireless modem out of the low power state; checking for a WAN page; determining the location of the mobile device; storing the location of the mobile device in memory; and returning the WAN wireless modem to the low power state.

In accordance with another example implementation, an apparatus may be provided for use in a mobile device comprising: means for transitioning a wide area network (WAN) wireless modem, on the mobile device, to a low power state; means for transitioning the WAN wireless modem out of the low power state in response to expiration of a first timer and expiration of a second timer; means for checking for a WAN page; means for determining the location of the mobile device; means for storing the location of the mobile device in memory; and means for returning the WAN wireless modem to the low power state.

In accordance with yet another example implementation, a mobile device may be provided which comprises: a memory; a wide area network (WAN) wireless modem; and one or more processing units coupled to the memory and the WAN wireless modem, the one or more processing units are configured to: transition the WAN wireless modem to a low power state; in response to expiration of a first timer and expiration of a second timer, transition the WAN wireless modem out of the low power state; check for a WAN page; determine the location of the mobile device; store the location of the mobile device in the memory; and return the WAN wireless modem to the low power state.

In accordance with an example implementation, a non-transitory computer-readable medium, having stored thereon computer-readable instructions to cause a processor to: transition a wide area network (WAN) wireless modem, on a mobile device, to a low power state; in response to expiration of a first timer and expiration of a second timer, transition the WAN wireless modem out of the low power state; check for a WAN page; determine a location of the mobile device; store the location of the mobile device in memory; and return the WAN wireless modem to the low power state.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some example techniques are presented herein which may be implemented in various methods, means and apparatuses in a mobile device to enable the update of a stored location for the mobile device in a power efficient manner. Example techniques and embodiments presented herein address various methods and apparatuses in a mobile device to reduce power consumption required to update the location of a mobile device while that device is in a low power state, such as a modem sleep mode, by delaying location refresh attempts until the next available paging slot.

In determining GNSS location, the mobile device may acquire a WAN-based frequency reference such as a pilot or other WAN signal, such as a traffic signal, to determine a GNSS reference frequency. The mobile device may also, in an embodiment, acquire a reference time such as GNSS time from the network to estimate GNSS time. In an embodiment, the mobile device may utilize a reference counter or other count indication in WAN signals to propagate a GNSS time derived from one or more GNSS satellite signals. In such an embodiment, a WAN signal frequency and counter value may be utilized, sometimes in conjunction with an internal clock, to propagate GNSS time forward from the last time GNSS time was determined. Thus, the WAN signal frequency can be used in conjunction with a WAN-based counter to determine elapsed time. If the WAN-based counter has a limited count range (i.e., the counter recycles after a maximum count value (representing the full cycle for the WAN counter)), the counter value and frequency may be used in conjunction with a clock on the mobile device to determine how many cycles of the WAN-based counter have elapsed and thereby determine a total number of elapsed counter increments. For example, [(full cycles X counter increments/full cycle)+(current counter increment value—initial counter increment value)]/(counter increments/sec), would provide an estimate of elapsed time based on an initial and current WAN counter value, the number of elapsed full cycles (as determined based on total elapsed time on an approximate mobile station clock), and on the frequency of the WAN signal (typically specified in the appropriate WAN standard and/or measured/characterized for a particular base station). The elapsed time may be added to the last determined GNSS time to determine a current GNSS time estimate.

An accurate estimate of GNSS time and/or GNSS frequency will reduce the GNSS search window and therefore reduce the GNSS search time associated with GNSS-based location determination. However, to determine an estimate of GNSS time and frequency may require one or more of the techniques discussed above, based upon the receipt of one or more WAN signals and the subsequent determination of WAN frequency and a WAN counter value and/or acquiring a GNSS time estimate or other absolute time estimate for the network. Also, obtaining GNSS assistance, such as long-term ephemeris assistance, GNSS ephemeris and/or GNSS almanac data typically requires a data session with the network, for example, over a WAN or Wi-Fi connection. GNSS assistance will also greatly reduce the time to fix for GNSS location and may be utilized with GNSS time and a GNSS frequency reference to determine location of the mobile device.

Note that, in a mobile device, managing power consumption and battery life is important relative to the overall usability of the mobile device. This is particularly true of devices that require longer intervals between charges such as tracking devices, wearables such as watches and many Internet of Things devices. These devices typically require both some communication capability to the network and/or other devices and some sort of location capability or capabilities. For example, location capabilities may include ranging or otherwise determining location from GNSS satellites, from wireless wide area network (WWAN) base stations, from wireless LAN (WLAN) access points and from other terrestrial transceivers. For some of these devices, that will mean support for some combination of WWAN and location capabilities. However, both WWAN and location determination consume power. Managing that power consumption while providing accurate and timely location is important.

In WWAN-capable devices, the mobile device goes into an idle state following network selection to save power. The device periodically wakes out of idle mode to check for overhead messages such as pages, an indication that a mobile-terminated call or message is incoming for the mobile device. To save power and extend battery life, the mobile device enters/re-enters a low power or sleep mode between checking for pages, where the mobile device powers down the WAN wireless modem and/or other circuitry. The WWAN modem wakes up periodically to check for overhead messages and/or pages for incoming mobile-terminated calls. For example, typically pages are between approximately 2-5 seconds, e.g., once in 5.12 seconds (or longer, depending on the network protocol and/or slot cycle) at which point the UE to wakes up to receive paging information from the eNodeB, gNodeB or other base station, as illustrated by period T1 in FIG. 3. During paging slots, the mobile device can access WAN signals while the WAN wireless modem is awake; this allows the mobile device to update GNSS time and GNSS frequency during the paging slot and thereby avoid waking the WAN wireless modem during sleep mode to access WAN signals and/or WAN-based information. Note that the term WAN wireless modem, as used herein, may refer to the WAN transceiver and/or the WAN baseband and/or various subcomponents thereof, such as the WAN antenna, or may refer to the combination of the WAN transceiver and WAN baseband as a whole.

Figure 3:
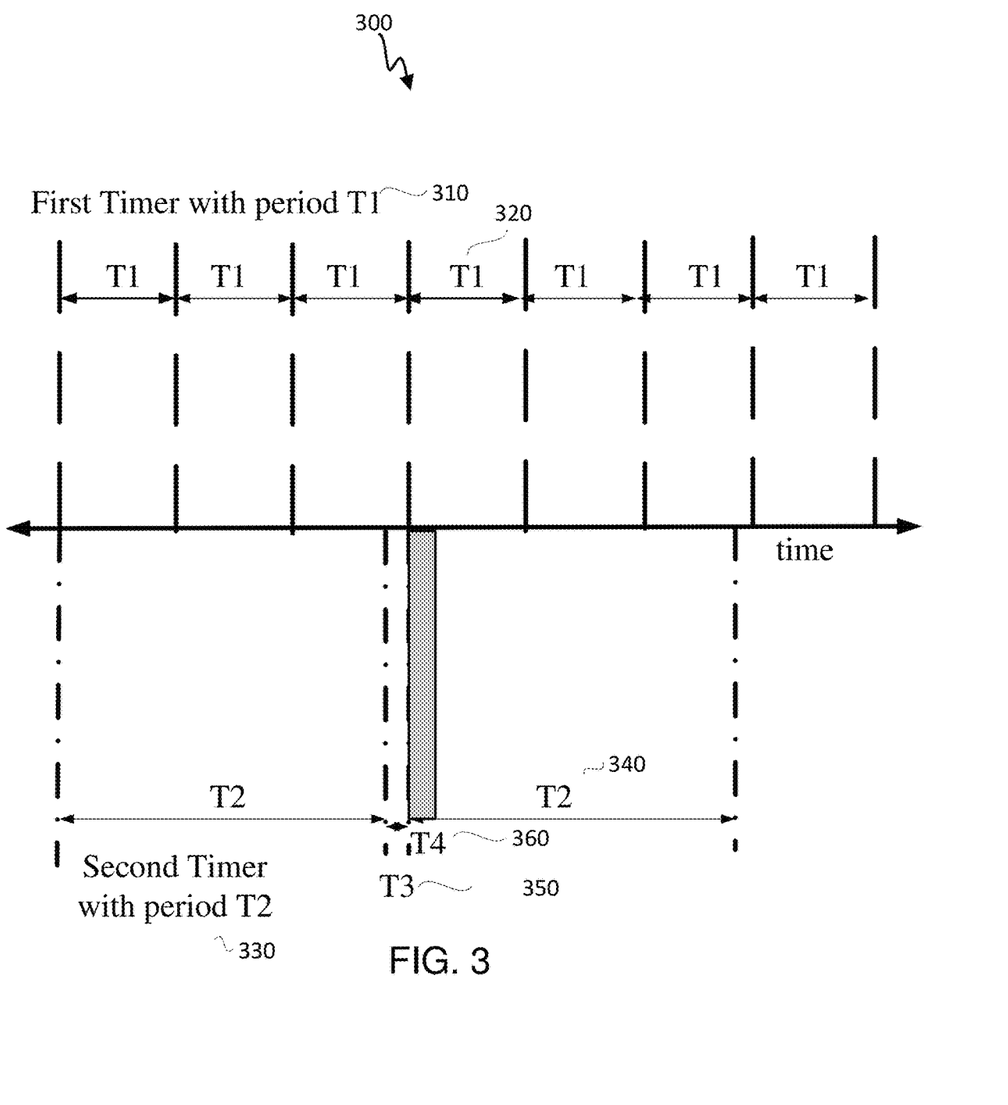
FIG. 3 is an exemplary timeline illustrating a concurrent paging slot timer and location refresh timer.

For location-enabled applications, many applications such as geofencing, freight tracking, child tracking, and location awareness (for example, for triggering actions or providing location context to information queries) require the location of the mobile device to be updated periodically. In some devices, this updating of location only occurs if movement is detected. In other devices, the updating occurs regardless of motion detection. In an embodiment, a location update may be performed approximately periodically, such as after a period T2, as illustrated in FIG. 3, after the last location update (using a location determination session). In an embodiment, a location update may occur every T2 period of time, regardless of how long it takes to determine location; for example, any delay incurred in waiting for a modem slot cycle or for a location operation to complete could be subsumed into the following T2 period. In another embodiment, the location update timer may be triggered after the last location operation is complete, such that the next location determination operation commences T2 time period after the last location operation completes. In an embodiment, the T2 timer may be triggered at the start of a modem slot cycle, for example, when a location operation is delayed until the start of the next modem slot cycle (when the modem wakes up to check for pages) as illustrated by delay T3 in FIG. 3. Having a recent determined location accelerates the next location determination attempt, for example, by reducing a search window for GNSS satellites based on GNSS ephemeris and/or GNSS almanac, GNSS frequency and GNSS time estimate, using the prior location determination stored in memory as a seed position to enable the calculation of the time and frequency search window for each satellite being searched for. Similarly, knowing a prior location may enable the download of a tailored base station and/or access point almanac based on the prior location and, in some embodiments, also based on an assumed uncertainty and/or based on the identification of a current serving cell and/or the identifications of cells and access points detected in scans.

If location is determined with GNSS, the GNSS receiver needs to wake up to perform a position fix to determine the location of the mobile device. A GNSS fix requires a search for GNSS satellite signals. The satellite search space may be significantly reduced, and hence the search time and power requirements reduced, if the mobile device has an accurate frequency reference and an accurate time reference. Using a seed location, such as the most recently stored location or the location of the serving cell or a trilaterated position from terrestrial transceivers such as base stations and access points, and GNSS constellation information (such as GNSS ephemeris and/or GNSS almanac and/or GNSS long term ephemeris or long term GNSS orbital predictions and/or other GNSS assistance), the mobile device may then efficiently acquire satellite signals and determine its location.

GNSS-related assistance is often provided as long-term ephemeris or other long-term GNSS satellite orbital predictions, some variants of which are accurate for up to a week, some variants of which may extend viability based on received GNSS signals, or as current GNSS satellite ephemeris information and/or almanac information. The GNSS assistance information enables the mobile device to determine the location and, in some embodiments, heading, velocity and other details relative of the satellite constellation at the current point in time.

Upon waking up, GNSS receiver may not have a good knowledge about its frequency, position and/or time. In an embodiment, time, obtained from the last satellite fix, may be propagated forward, including during sleep. In an embodiment, time may be obtained from the network via the WWAN or other wireless modem. In an embodiment, the WWAN clock may be turned off during sleep and time may be propagated based on a lower accuracy, lower power sleep clock. In an embodiment, frequency may be obtained from the wireless network via the WWAN modem or other wireless modem, using wires terrestrial transceiver signal frequency such as that from WWAN base stations as a frequency reference that is generally more accurate and less subject to drift than that maintained on the mobile device. In an embodiment, the mobile device may use the identity of the serving cell and/or the identities of other terrestrial transceivers in view to determine an initial location. For example, the mobile device may access a local base station almanac on the mobile device to look up the identities and location of the visible base stations and other terrestrial transceivers. In an embodiment, the mobile may, if a local base station almanac is either not already available or does not contain entries for the visible base stations and/or other terrestrial transceivers (such as access points), contact a location server or base station almanac server to obtain an almanac that contains entries for at least some of the visible base stations and terrestrial transceivers. To do so, the mobile device would need to leave sleep and establish a data call/connection to the location server and/or almanac server. Using these and other techniques, the mobile device may determine estimates for current location, current time and/or an accurate frequency reference that may either be used as the location estimate to be stored in memory (in the case where an approximate location estimate is calculated using base station and/or other terrestrial transceiver (such as access point) location and range) or may be used to narrow the search windows for GNSS satellites to determine a GNSS-based location. The more accurate the time and frequency references and/or the more accurate the seed position, the quicker, more effectively and more efficiently a GNSS-based location can be determined. Because many of these techniques rely on a connection to a wireless base station or other terrestrial transceiver, they work best if the WAN wireless modem, such as the WWAN modem, is woken up. To avoid waking up the modem(s), such as the WWAN and/or WLAN modems both for location determination and to check for wireless messages and pages in the overhead channel (both consuming power), in an embodiment, the location determination process may be delayed until the modem wakes to check for pages and/or messaging during which time the network frequency, time reference and/or location assistance may be obtained. In an embodiment where the time between location determination attempts is normally significantly longer (e.g., once an hour or once a day) than the time between checking for pages by the WAN wireless modem, the added delay incurred prior to determining location, for example, T3 in FIG. 3, generally does not significantly impact the timing at which a refreshed location may be made available. Similarly, in an embodiment where the time between location determination attempts is normally significantly longer (e.g., once an hour or once a day) than the time between refreshing location, the added delay incurred to determine location, period T4 in FIG. 3, may not significantly impact the timing at which a refreshed location may be made available. In an embodiment, in a situation where the device is moving fairly constantly, the time between location determination attempts and the time between checking for pages may be comparable.

For example, in an embodiment with a paging period of 5.12 s and location determination period of approximately every 5 s, the location determination process could be initiated right after the WWAN paging epoch. In an embodiment, if assistance data for GNSS is needed, the UE could schedule a data session right after the paging slot, to send a request to a location server or almanac server to request, and subsequently obtain location assistance such as base station and terrestrial. Location assistance could consist of base station almanac information (for terrestrial transceiver location and other information) or of satellite acquisition information and/or GNSS ephemeris, GNSS long-term ephemeris and/or GNSS almanac data. In an embodiment, the UE can schedule the GNSS session after the paging slot or, if assistance is requested, after the assistance data is received. This procedure enables access, for the GNSS search process, to frequency, time, and/or position and/or assistance data right at the beginning of its session without the need to independently wake up the WWAN modem outside of the normal wake up to check for wireless pages and/or overhead messages.

In an embodiment, the mobile device may opportunistically align GNSS location determination processes with any periodic processing epoch in the WWAN modem. For example, in an embodiment, if the WWAN modem periodically receives data from the network, the UE can intelligently schedule a GNSS session after each periodic processing epoch.

As noted, waking up the WWAN modem out of sleep, for the sole purpose of conducting a location session, such as a GNSS session, may be costly in term of power consumption. The power consumption may be increased in some mobile devices, such as in some Internet of Things (IOT) devices, where many HW components are shared between WWAN or other modems and GNSS. The power consumption associated with loading and unloading processes and/or images associated with WWAN and GNSS may significantly reduce the battery life of the mobile device. By leveraging the WAN wireless modem being awake to check for pages and overhead messages to then also use the WAN wireless modem to provide frequency, time and/or location reference-related information (such as the ID of the serving cell or nearby access points/cells), the mobile device may save significant power over having to wake the WAN wireless modem both to check for pages and to determine location separately. Meanwhile, the information obtained from the WAN wireless modem, enables a faster time to fix, increased sensitivity, greater search power efficiency and, in some instances, greater location accuracy.

Figure 1:
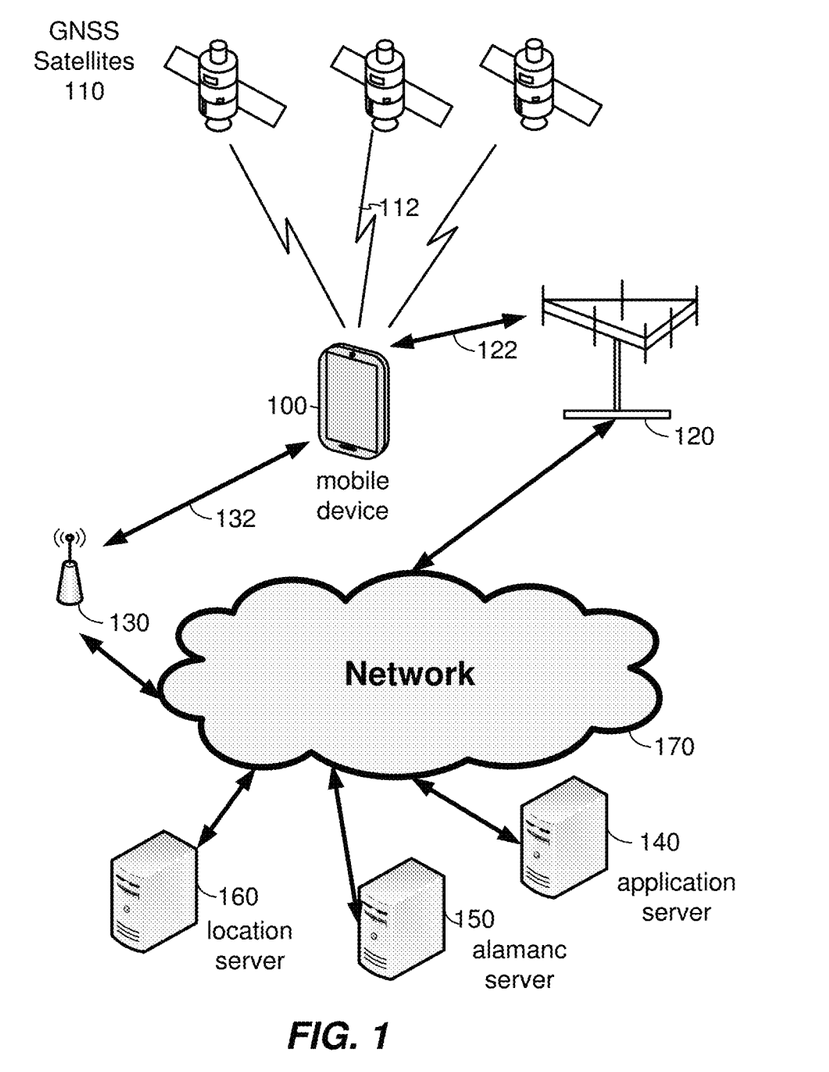
FIG. 1 is a system diagram including wireless-capable, location-enabled mobile devices.
Figure 2:
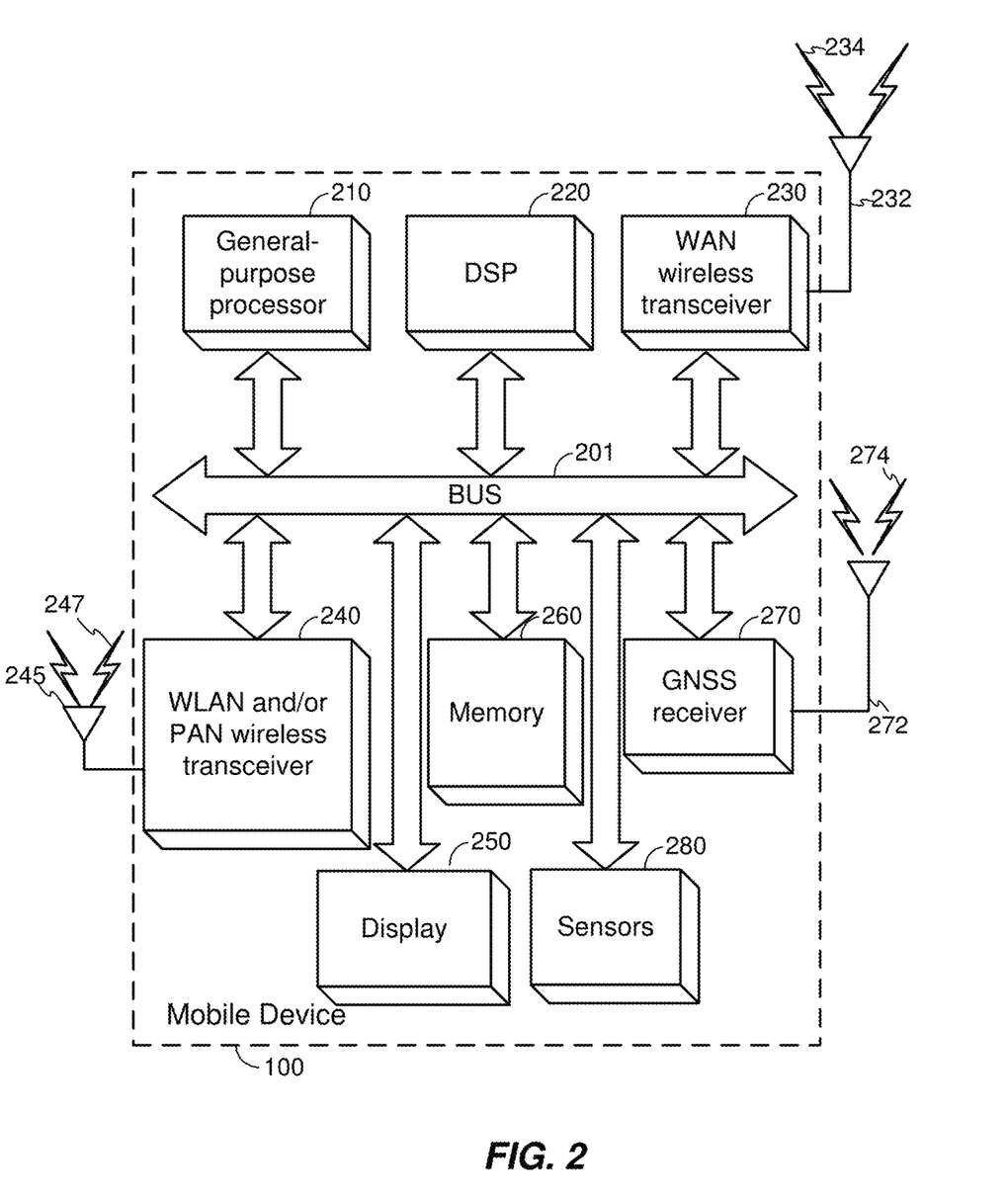
FIG. 2 is an exemplary mobile device capable of receiving GNSS and WAN signals.

FIG. 1 illustrates a system and means for implementing the various methods and techniques described in the figures and text herein. As shown in FIG. 2, in an embodiment, mobile device 100, which may also be referred to as a UE (or user equipment), may transmit radio signals to, and receive radio signals from, a wireless communication network. In an embodiment, as shown in FIG. 1, mobile device 100 may communicate, via wide area network (WAN) wireless transceiver 120, via wireless antenna 232 and WAN wireless transceiver 230, with a cellular communication network by transmitting wireless signals to, or receiving wireless signals from a WAN wireless transceiver 120 which may comprise a wireless base transceiver subsystem (BTS), a Node B or an evolved NodeB (eNodeB) or a next generation NodeB (gNodeB) or other WAN wireless transceiver 120 over wireless communication link 122. Similarly, mobile device 100 may transmit wireless signals to, or receive wireless signals from local transceiver 130 over wireless communication link 132, for example, by using wireless local area network (WLAN) and/or personal area network (PAN) wireless transceiver 240 and antenna 245. In an embodiment, local transceiver 130 may be a WLAN access point, a Bluetooth transceiver, a ZigBee transceiver, or other WLAN or PAN transceiver. A local transceiver 130 and/or a WAN wireless transceiver 120 may comprise an access point (AP), femtocell, Home Base Station, small cell base station, Home Node B (HNB), Home eNodeB (HeNB), eNodeB or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect. In an embodiment, GNSS signals 112 from GNSS Satellites 110 are utilized by mobile device 100 for location determination. In an embodiment, signals 122 from WAN transceiver(s) 120 and signals 132 from WLAN and/or PAN local transceivers 130 are used for location determination, alone or in combination with GNSS signals 112.

Examples of network technologies that may support wireless transceiver 230 and WAN wireless transceiver 120 are Global System for Mobile Communications (GSM), Code Division Multiple Access (CDMA), Wideband CDMA (WCDMA), Long-term Evolution (LTE), $5^{th}$ Generation Wireless (5G) or New Radio Access Technology (NR), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. WAN wireless transceivers 120 may comprise deployments of equipment providing subscriber access to a wireless telecommunication network for a service (e.g., under a service contract). Here, a WAN wireless transceiver 120 may perform functions of a wide area network (WAN) or cell base station in servicing subscriber devices within a cell determined based, at least in part, on a range at which the WAN wireless transceiver 120 is capable of providing access service. Examples of WAN base stations include GSM™, WCDMA™, LTE™, CDMA™, HRPD™, WiFi™, BT, WiMax™, and/or $5^{th}$ Generation (5G) base stations. In an embodiment, further wireless transceivers 240 may comprise a wireless LAN (WLAN) and/or PAN transceiver. In an embodiment, mobile device 100 may contain multiple wireless transceivers including WAN, WLAN and/or PAN transceivers. In an embodiment, radio technologies that may support wireless communication link or links (wireless transceiver 240) further comprise Wireless local area network (e.g., WLAN, e.g., IEEE 802.11), Bluetooth™ (BT) and/or ZigBee™.

In an embodiment, mobile device 100, using wireless transceiver(s) 230 or 240, may communicate with application server 140, almanac server 150 and/or location sever 160 over a network 170. In an embodiment, application server 140 may provide application related information and/or location assistance and/or may request or otherwise receive location information from the mobile device that may be used to retrieve and provide application-related information to the mobile device 100 such as location sensitive search results (closest restaurant, closest gas, etc.). Almanac server 150 and/or location sever 160 may receive approximate location information from the mobile device 100 or from the network 170 related to the location of the mobile device and use that approximate location to determine and retrieve location assistance for the mobile device and provide that assistance information to the mobile device. That information may comprise base station almanac information for base stations and terrestrial transceivers that are in view or of a broader area, in some embodiments, based on areas that the mobile device may have historically been in, is currently in, or is likely to be in. Location assistance from location server 160 may also be for GNSS assistance such as GNSS almanac information, GNSS satellite ephemeris information, GNSS signal acquisition information, and/or long-term GNSS assistance, for example, in the form of GNSS orbital predictions or GNSS orbital data.

Here, network 170 may comprise any combination of wired or wireless connections and may include WAN wireless transceiver 120 and/or local transceiver 130 and/or servers 140, 150 and/or 160 or other servers. In an embodiment, network 170 may comprise Internet Protocol (IP) or other infrastructure capable of facilitating communication between mobile device 100 and servers 140, 150 and/or 160 through local transceiver 130 or WAN wireless transceiver 120. In an embodiment, network 170 may comprise cellular communication network infrastructure such as, for example, a base station controller or packet based or circuit based switching center (not shown) to facilitate mobile cellular communication with mobile device 100. In an embodiment, network 170 may comprise local area network (LAN) elements such as Wi-Fi APs, routers and bridges and may in that case include or have links to gateway elements that provide access to wide area networks such as the Internet. In other implementations, network 170 may comprise a LAN and may or may not have access to a wide area network but may not provide any such access (if supported) to mobile device 100. In some implementations, network 170 may comprise multiple networks (e.g., one or more wireless networks and/or the Internet). In one implementation, network 170 may include one or more serving gateways or Packet Data Network gateways. In addition, one or more of servers 140, 150 and/or 160 may be a map server, a crowd source server, a location server and/or a navigation server.

In an embodiment, location server 160 may provide assistance data to mobile device 100 to enable or enhance the ability of mobile device 100 to determine its location. In an embodiment, location server 160 may determine the location of mobile device 100 based upon signal measurements from GNSS satellites and terrestrial base stations and access points, other signals, photos, sensor input or other data obtained at the mobile device 100. In an embodiment, location server 160 may provide GNSS acquisition assistance, ephemeris information and/or long-term orbital information and/or terrestrial transceiver locations, identifications and other terrestrial transceiver locations.

In various embodiments, and as discussed below, mobile device 100 may have circuitry and processing resources capable of obtaining location related measurements (e.g. for signals received from GPS, GNSS or other Satellite Positioning System (SPS) satellites 110, WAN wireless transceiver 120 or WLAN or PAN local transceiver 130 and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g., in an embodiment, location sever 160) after which the location server may estimate or determine a location for mobile device 100 based on the measurements. In the presently illustrated example, location related measurements obtained by mobile device 100 may include measurements of signals (112) received from satellites belonging to an SPS or Global Navigation Satellite System (GNSS) (110) such as GPS, GLONASS, Galileo or Beidou and/or may include measurements of signals (such as 122 and/or 132) received from terrestrial transmitters fixed at known locations (e.g., such as WAN wireless transceiver 120). Mobile device 100 or a location server 160 may then obtain a location estimate for mobile device 100 based on these location related measurements using any one of several position methods such as, for example, GNSS, Assisted GNSS (A-GNSS), Advanced Forward Link Trilateration (AFLT), Multilateration, Observed Time Difference of Arrival (OTDOA) or Enhanced Cell ID (E-CID), network triangulation, Received Signal Strength Indication (RSSI) or combinations thereof. In some of these techniques (e.g. A-GNSS, AFLT and OTDOA, RSSI), pseudoranges, ranges or timing differences may be measured at mobile device 100 relative to three or more terrestrial transmitters at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 160 may be capable of providing positioning assistance data to mobile device 100 including, for example, information regarding signals to be measured (e.g., signal timing and/or signal strength), locations and identities of terrestrial transmitters, and/or signal, timing and orbital information for GNSS satellites to facilitate positioning techniques such as A-GNSS, AFLT, OTDOA and E-CID. For example, servers 140, 150 or 160 may comprise an almanac which indicates locations and identities of wireless transceivers and/or local transceivers in a particular region or regions such as a particular venue, and may provide information descriptive of signals transmitted by a cellular base station or AP or mobile terrestrial transceiver such as transmission power and signal timing. In the case of E-CID, a mobile device 100 may obtain measurements of signal strengths for signals received from WAN wireless transceiver 120 and/or wireless local area network (WLAN) or PAN local transceiver 130 and/or may obtain a round trip signal propagation time (RTT) between mobile device 100 and a WAN wireless transceiver 120 or wireless local transceiver 130. A mobile device 100 may use these measurements together with assistance data (e.g. terrestrial almanac data such as a base station and/or access point almanac or GNSS satellite data such as GNSS Almanac and/or GNSS Ephemeris information) received from a location server 160 to determine a location for mobile device 100 or may transfer the measurements to a location server 160 to perform the same determination.

In various embodiments, location may be determined through various means, as described above. For example, in an embodiment, the mobile device 100 may determine its location with GNSS satellite signal measurements, with terrestrial transmitter signal measurements or some combination thereof. In an embodiment, the mobile device 100 may determine its location using accelerometers and/or gyros to determine, via dead reckoning, distance and direction traveled from the last known position. In an embodiment, the mobile device 100 may determine its location using a combination of signals and sensors 280; for example, a location may be determined using various signal measurements from GNSS and terrestrial transmitters and then updated using dead reckoning. From a determined location, various signal measurements can be taken from visible transmitters to obtain an indication of distance of the transmitter from a determined location. The indication of distance may include signal strength or round-trip time or time of arrival or other distance estimation methods. New signal measurements may be taken at new determined locations. By combining indications of distance to any given transmitter taken from multiple locations, whether by one device or by a plurality of devices, the location of a transmitter, such as a WAN wireless transceiver 120 or WLAN or PAN local transceiver 130, may be determined. The location of the transmitter may be determined on mobile device 100 or on a crowd sourcing server or on a location server 160 or other network-based server.

A mobile device (e.g. mobile device 100 in FIG. 2) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, Wi-Fi, BT, WiMAX, Long-term Evolution (LTE), 5th Generation Wireless (5G) or new radio access technology (NR), etc. A mobile device may also support wireless communication using a wireless LAN (WLAN such as, for example, 802.11 technology), personal area network (PAN) such as Bluetooth™ or ZigBee, DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

FIG. 2 illustrates an embodiment of a mobile device, a non-limiting example for implementing the various methods and techniques illustrated in the figures and text herein. As shown in FIG. 2, in an embodiment, mobile device 100, which may also be referred to as a UE (or user equipment), may include one or more general-purpose processor(s) 210. The general-purpose processor 210 may sometimes be referred to by other names such as an applications processor, a general processor, a main processor or a processor. Various functionality may run on the general-purpose processor 210 such as applications, operating system functions and general mobile device functions. General-purpose processor 210 may also include multiple processors, in some embodiments including additional processors, that perform more specialized functionality, or parts thereof, such as processing related to camera sensors, video, audio and wireless signal processing such as wireless baseband processors. In an embodiment, mobile device 100 may also include a DSP 220, which may be used for various compute processing tasks such as video and graphical processing, image processing, facial identification, feature matching, scene matching, display management, GNSS signal processing, WAN signal processing, Wi-Fi signal processing and PAN signal processing. Some tasks may, in some embodiments, be split between the general-purpose processor and one or more DSPs such as location determination, where signal search, processing and correlation may happen at the DSP level while location determination may be calculated at the general-purpose processor 210.

In mobile device 100, wireless transceiver(s) such as WAN wireless transceiver 230, and WAN antenna 232, may support various wide area network (WAN) connections (e.g., Global System for Mobile Communications (GSM), Code Division Multiple Access (CDMA), Wideband CDMA (WCDMA), Long-term Evolution (LTE), 5$^{th}$ Generation Wireless (5G) or new radio access technology (NR), High Rate Packet Data (HRPD)) or combinations thereof. Wireless transceiver(s) 230 and 240 may be implemented by multi-mode transceivers, discrete transceivers, separate or shared antennas (232, 245) or various combinations thereof. In mobile device 100, wireless transceiver(s) such as WLAN and/or PAN wireless transceiver 240, and WLAN and/or PAN antenna 245, may support various wireless local area network (WLAN) and personal area network (PAN) connections (e.g., wireless LAN connections (e.g., Wi-Fi/802.11) and personal area network (PAN) connections (e.g., Bluetooth and ZigBee), near field communication (NFC, sometimes known as contactless (CTLS) or CTLS NFC) or combinations thereof. Wireless transceiver(s) 240 may be implemented by multi-mode transceivers, discrete transceivers, separate or shared antennas (245) or various combinations thereof.

Mobile device 100 may contain a GNSS receiver (270) and GNSS antenna 272. The GNSS receiver 270 may measure various GNSS signals 274 received from satellites belonging to an SPS or Global Navigation Satellite System (GNSS) such as GPS, GLONASS, Galileo and/or Beidou. These signal measurements may be utilized to determine location either alone or in combination with terrestrial signals such as WAN, WLAN and PAN signals.

Mobile device 100 may include various sensors and may, in some embodiments be discrete or in some embodiments, be integrated into a sensor subsystem. Sensors may include, in various embodiments, accelerometers such as 3D accelerometers, gyros such as 3D gyros, and magnetometers, often used alone or in combination to determine dead reckoning output such as heading, distance, and orientation. Sensors may be used, in an embodiment to determine velocity or speed and acceleration and/or used to determine step count and gait. Other sensors, in an embodiment, may include camera sensors, light sensors, and pressure sensors or other altimeters or other sensor types such as medical and chemical sensors.

Mobile device 100 may include a display 250. In some embodiments, display 250 may be a touchscreen capable of both displaying visual output and receiving touch or other input. The display 250 be associated with a virtual keyboard on the display, sometimes on demand, or by an actual keyboard, for character input. Mobile device 100 may also include memory 260, which may comprise FLASH, RAM, ROM, disc drive, or FLASH card or other memory devices or various combinations thereof. In an embodiment, memory 260 may contain instructions to implement various methods described throughout this description. In an embodiment, memory may contain instructions for requesting map information, for displaying map information, for requesting route information and/or displaying route information.

FIG. 3 illustrates an example timeline 300. In an embodiment, mobile device 100 may check for pages, based on a first timer (310) with period T1 (320). Mobile device 100 may calculate location after a period T2 (340) determined with a second timer (330). When time period T2 (340) has passed, the location session may be delayed by time T3 (350) until the beginning of the next period T1 (320), when the mobile device will wake up to check for pages and overhead messages. Then, if time T2 (340) has also elapsed, the mobile device will also determine location. Determining location may occur over a period of time T4 (360). For the following period T2 (340), the next location determination attempt may commence, in an embodiment, immediately after the prior period T2, at the start of the next check for pages and/or overhead messages (e.g., after time T3 has elapsed, as illustrated in FIG. 3) or after location is determined (e.g., after time T4 has also elapsed). One skilled in the art would realize that these embodiments are not intended to be limiting and that the various embodiments may be combined, triggered in different circumstances and/or may be configurable.

In an embodiment, the first timer 310 is a paging slot timer with period 320. In an embodiment, the second timer 330 is a location determination timer. In an embodiment, the period of the first timer is shorter than a period of the second timer. For example, a mobile device may check for pages and overhead messages more often than it re-calculates location. For example, T2 may be greater than T1.

Figure 4:
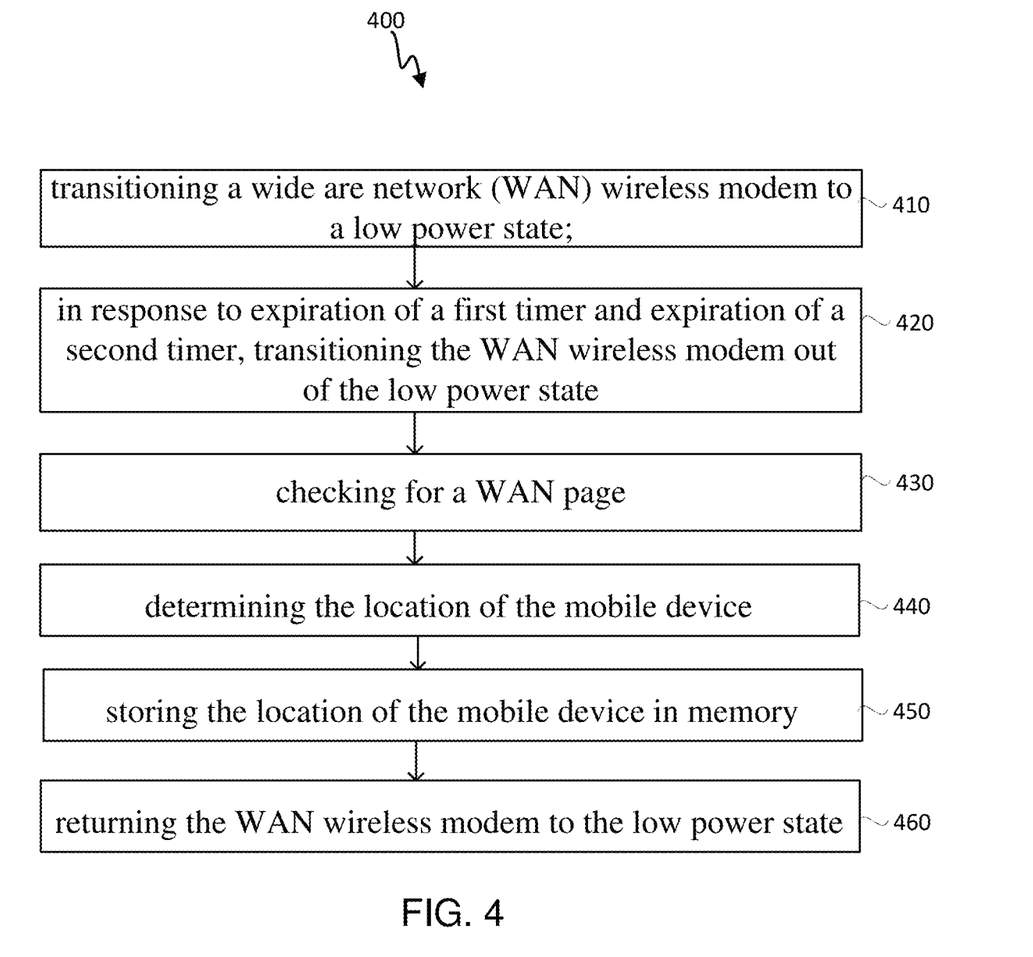
FIG. 4 illustrates an embodiment for delaying location refresh attempts until the next available paging slot while a mobile device modem is in a low power state.

FIG. 4 illustrates a method and technique 400 for determining location on a mobile device commencing during the next wakeup to check for pages and overhead messages. It is understood that various means may be utilized to perform the method of FIG. 4, including the use of a mobile device 100, as described in FIG. 2 and its accompanying description.

In an embodiment, in step 410, the mobile device 100 transitions a wireless modem, typically a wireless wide area network (WWAN) modem (such as WAN wireless transceiver 230) to a low power state. In an embodiment, the entire device may be put into a sleep state. In an embodiment, an applications processor (e.g., general purpose processor 210) may still be utilized while the WAN wireless modem(s) and, in some embodiments, various wireless interfaces such as the GNSS receiver are put into a sleep state; for example, while a user accesses a local application or other local applications remain active.

In step 420, in response to expiration of a first timer and expiration of a second timer, the mobile device exits the WAN wireless modem low power state. Typically, upon exiting the low power state, the WAN wireless transceiver 230 will be activated, such that it can receive wireless signals 234 over antenna 232, including receiving signals to check for overhead messages and pages. Thus, in step 430, the mobile device checks for WAN pages; for example, WAN pages may be received from the base station as part of an incoming call or message. The mobile device may also check for overhead messages.

In step 440, the mobile device determines the location of the mobile device. In various embodiments, the location of the mobile device may be determined through a mobile-based technique such as by measuring GNSS signals or terrestrial transceivers signals. The location of the mobile device may also be determined through a server-based technique where the mobile measures and sends ranging information from various transmitters (GNSS and/or terrestrial transmitters) to a location server 160 which calculates the location of the mobile device. In an embodiment, the mobile device 100 may receive GNSS signals 274 received at GNSS antenna 272 and GNSS receiver 270 and calculate location using DSP 220 and/or general-purpose processor 210. In an embodiment, the mobile device 100 may receive WAN signals 234 received using WAN antenna 232 and WAN wireless transceiver 230 and/or WLAN and/or PAN wireless signals 247 using antenna 245 and WLAN and/or PAN wireless transceiver 240 and calculate location using DSP 220 and/or general-purpose processor 210. In an embodiment, mobile device 100 may combine ranges from GNSS, WAN, WLAN or PAN or various combinations thereof. In an embodiment, assistance data such as a base station almanac may be received from a server such as location server 160 or a crowd source server. In an embodiment, GNSS assistance such as long-term ephemeris, ephemeris or satellite almanac data may be received from a location server 160. In an embodiment, a base station almanac, as may be received from a location server 160 or an almanac server 150, may provide locations and identifiers for terrestrial transceivers utilized for determining ranges in combination with received signals from terrestrial transceivers such as wide area network (WAN) wireless transceiver 120, WLAN and/or PAN wireless local transceiver 130, which may be used with signal measurements from WAN, WLAN and PAN transceivers to determine ranges to the mobile device 100 and the location of mobile device 100. Ranges may be determined based on signal delay, round trip time and/or signal strength (e.g., RSSI). Similarly, GNSS assistance may be utilized with GNSS signal measurements to determine a location of the mobile device.

In an embodiment, determining a location of the mobile device may include receiving, at the mobile device, a base station almanac. In an embodiment, the base station almanac may be received from, for example, an almanac server 150 or a location server 160. The base station almanac may, in an embodiment, include base station information and other transceiver information, including identifiers and locations, for base stations and other terrestrial transceivers detectable, or a possibly detectable if the mobile device moves from its current location, from the estimated current location of the mobile device 100. In an embodiment, the mobile device may receive, at the mobile device, GNSS assistance. For example, the mobile device may receive GNSS assistance from location server 160 or other assistance server. Assistance may be applicable for a short period of time or may be long-term assistance such as long-term orbital predictions. Some long-term orbital predictions may be effective for up to a week or more. Some long-term GNSS assistance data may be effective for at least one day.

In an embodiment, determining the location of the mobile device comprises acquiring a WAN frequency reference; estimating GNSS time; and determining GNSS pseudoranges. In an embodiment, the WAN frequency reference and estimated GNSS time are used in conjunction with GNSS satellite assistance information such as orbital predictions, to determine the search window for each GNSS satellite.

In an embodiment, determining the location of the mobile device comprises determining an uncertainty associated with the stored location; comparing the determined uncertainty with a predetermined uncertainty threshold; and, responsive to the determined uncertainty exceeding the predetermined uncertainty threshold, determining an updated location of the mobile device. For example, the stored location of the mobile device may be aged, such that the uncertainty associated with the stored location of the mobile device is aged and grows over time, for example, based on assumptions about a reasonable speed at which the mobile device could move from its current location. The calculated uncertainty, based for example, on the age of the stored location, may be compared against a threshold uncertainty, which, if exceeded, triggers re-calculation of the location of the mobile device. The threshold uncertainty may be pre-determined or it may be provided dynamically, such as via an application API or request or as provided in a location request from a remote entity such as application server 140 or location server 160.

In step 450, the mobile device stores the location of the mobile device in memory. In an embodiment, the location of the mobile device may be a latitude and longitude. The location may further comprise an altitude. In an embodiment, the location may be an address or an associated label such as "home" or "work" or "office." In an embodiment, the location may comprise an identification associated with a base station or base stations or other terrestrial transceivers. One skilled in the art would realize that these examples are not limiting and may include other embodiments, for example, names of areas or of specific sites such as conference room labels or city area names.

In step 460, the mobile device returns the WAN wireless modem to a low power state. For example, the WAN wireless modem such as WAN wireless transceiver 230 may be put into a sleep mode or otherwise de-powered or operated at a lower power than when in active communication.

In an embodiment, the mobile device may then transition out of the low power state. The exit may be to check for pages and/or overhead messages or in response to receiving a message or in response to use of the mobile device or in response to an outgoing call or in response to an application executing on the mobile device or for other reasons.

In an embodiment, the mobile device may receive a location request for the location of the mobile device. The location request may originate locally, such as through an application running on the mobile device or through a user interface, or the location request may originate through the network, such as from application server 140 or location server 160. For example, the mobile device, when checking for pages, may receive a request for location of the mobile device from an application server 140.

In an embodiment, the mobile device may provide the stored location of the mobile device in response to the location request. For example, the stored location may be provided to an application running on mobile device 100 or sent over WAN wireless transceiver 230 or WLAN and/or PAN wireless transceiver 240 to application server 140. In an embodiment, the stored location may be used as a seed location to determine a new location, for example, utilizing GNSS ranging. For example, the stored location in conjunction with frequency, time and satellite constellation information can be used to re-determine the location of the mobile device. In an embodiment, the newly determined location may be sent to the application or to an application server 140 or location server 160 instead of or in addition to the stored location.

In an embodiment, providing the stored location of the mobile device may also comprise providing an updated location of the mobile device. In an embodiment, providing the stored location may further comprise providing both the stored location and an updated location of the mobile device. For example, if the stored location is older than a threshold age or if the stored location's uncertainty has grown larger than a specified threshold uncertainty, an updated location may be determined and provided. Also, in an embodiment, receiving the location request may comprise receiving a location request from an application on the mobile device or receiving a message from an application server or other network entity requesting a location of the mobile device.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long-term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long-term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home. In such an implementation, one or more mobile devices may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Gallileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long-term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of periodic location determination on a mobile device, comprising:
    setting a location determination timer;
    transitioning a GNSS receiver to a low-powered state;
    transitioning a wide area network (WAN) wireless modem, on the mobile device, to a low power modem state, wherein the low power modem state comprises powering down the WAN wireless modem;
    in response to expiration of a paging slot timer, transitioning the WAN wireless modem to a powered state;
    in response to expiration of the location determination timer during the low power modem state, in absence of a pending application related request for position update, and subsequent expiration of the paging slot timer:
    transitioning the GNSS receiver to a powered state;
    measuring GNSS signal information; and
    transitioning the GNSS receiver into the low-powered state; and
    transitioning the WAN wireless modem to the low power modem state.

2. The method of claim 1, wherein a period of the paging slot timer is shorter than a period of the location determination timer.

3. The method of claim 1, further comprising:
receiving, at the mobile device, a base station almanac; and
determining, using the base station almanac, a GNSS-based location of the mobile device.

4. The method of claim 1, further comprising:
receiving, at the mobile device, long-term orbital predictions; and
determining a GNSS-based location of the mobile device using the long-term orbital predictions.

5. The method of claim 4, wherein the long-term orbital predictions comprise long-term orbital predictions effective for a week.

6. The method of claim 1, further comprising determining a GNSS-based location of the mobile device comprising: acquiring a WAN frequency reference; estimating GNSS time; and determining GNSS pseudoranges.

7. The method of claim 1, further comprising determining a GNSS-based location of the mobile device comprising: determining an uncertainty associated with the stored GNSS-based location; comparing the determined uncertainty with a predetermined uncertainty threshold; and, responsive to the determined uncertainty exceeding the predetermined uncertainty threshold, determining an updated location of the mobile device.

8. The method of claim 1, further comprising:
receiving a location request for the mobile device while the WAN wireless modem is in a powered state; and
providing a stored GNSS-based location of the mobile device.

9. The method of claim 8, wherein receiving the location request comprises receiving a location request from an application on the mobile device.

10. The method of claim 8, wherein receiving the location request comprises receiving a message from an application server requesting the location of the mobile device.

11. The method of periodic location determination of a mobile device of claim 1, further comprising: in response to expiration of the location determination timer while the WAN wireless modem is in a high power state, determining a GNSS-based location.

12. A mobile device for periodic location determination, comprising:
a memory;
a global navigation satellite system (GNSS) receiver;
a wide area network (WAN) wireless modem; and
one or more processing units coupled to the memory and the WAN wireless modem, wherein the one or more processing units are configured to:
set a location determination timer;
transition the GNSS receiver to a low-powered state;
transition the WAN wireless modem to a low power modem state, wherein the low power modem state comprises powering down the WAN wireless modem;
in response to expiration of a paging slot timer, transitioning the WAN wireless modem to a powered state;
in response to expiration of the location determination timer during the low power modem state, in absence of a pending application related request for position update, and subsequent expiration of the paging slot timer:
transition the GNSS receiver to a powered state;
measure GNSS signal information; and
transition the GNSS receiver into the low-powered state; and
transition the WAN wireless modem to the low power modem state.

13. The mobile device of claim 12, wherein: a period of the paging slot timer is shorter than a period of the location determination timer.

14. The mobile device of claim 12, wherein the one or more processing units are further configured to:
receive, at the mobile device, a base station almanac; and
determine, using the base station almanac, a GNSS-based location of the mobile device.

15. The mobile device of claim 12, wherein the one or more processing units are further configured to: receive, at the mobile device, long term orbital predictions; and
determine a GNSS-based location of the mobile device based upon the long-term orbital predictions.

16. The mobile device of claim 15, wherein the long-term orbital predictions comprise long term orbital predictions effective for a week.

17. The mobile device of claim 12, wherein the one or more processing units are further configured to determine a GNSS-based location of the mobile device, comprising: the one or more processing units configured to: acquire a WAN frequency reference; estimate GNSS time; and determine GNSS pseudoranges.

18. The mobile device of claim 12, wherein the one or more processing units are further configured to determine a GNSS-based location of the mobile device, comprising the one or more processing units configured to: determine an uncertainty associated with the stored GNSS-based location; compare the determined uncertainty with a predetermined uncertainty threshold; and, responsive to the determined uncertainty exceeding the predetermined uncertainty threshold, determine an updated location of the mobile device.

19. The mobile device of claim 12, wherein the one or more processing units are further configured to:
receive a location request for the mobile device while the WAN wireless modem is in a powered state; and
provide a stored GNSS-based location of the mobile device.

20. The mobile device of claim 19, wherein the one or more processing units configured to receive the location request comprise: one or more processing units configured to receive a location request from an application on the mobile device.

21. The mobile device of claim 19, wherein the one or more processing units configured to receive the location request comprise: one or more processing units configured to receive a message from an application server requesting the location of the mobile device.

22. The mobile device for periodic location determination of claim 12, wherein the processor is further configured to: in response to expiration of the location determination timer while the WAN wireless modem is in a high power state, determine a GNSS-based location.

23. A non-transitory computer-readable medium, having stored thereon computer-readable instructions to cause a processor to:
set a location determination timer;
transition a GNSS receiver to a low-powered state;
transition a wide area network (WAN) wireless modem, on a mobile device, to a low power modem power state, wherein the low power modem state comprises powering down a WAN wireless modem;
in response to expiration of a paging slot timer, transitioning the WAN wireless modem to a powered state;
in response to expiration of the location determination timer during the low power modem state, in absence of a pending application related request for position update, and subsequent expiration of the paging slot timer:
transition the GNSS receiver to a powered state;
measure GNSS signal information; and
transition the GNSS receiver into the low-powered state; and
transition the WAN wireless modem to the low power modem state.

24. The non-transitory computer-readable medium of claim 23, wherein a period of the paging slot timer is shorter than a period of the location determination timer.

25. A mobile device for periodic location determination, comprising:
means for setting a location determination timer;
means for transitioning a GNSS receiver to a low-powered state;
means for transitioning a wide area network (WAN) wireless modem, on the mobile device, to a low power modem state, wherein the low power modem state comprises powering down the WAN wireless modem;
means for, in response to expiration of a paging slot timer, transitioning the WAN wireless modem to a powered state;
means for, in response to expiration of the location determination timer during the low power modem state, in absence of a pending application related request for position update, and subsequent expiration of the paging slot timer:
means for transitioning the GNSS receiver to a powered state;
means for measuring GNSS signal information; and
means for transitioning the GNSS receiver into the low-powered state; and
means for transitioning the WAN wireless modem to the low power modem state.

26. The mobile device of claim 25, wherein a period of the paging slot timer is shorter than a period of the location determination timer.

\* \* \* \* \*